United States Patent
Legakis et al.

(10) Patent No.: US 9,848,130 B2
(45) Date of Patent: *Dec. 19, 2017

(54) MOTION-BASED CONTENT NAVIGATION

(71) Applicant: Moju Labs, Inc., San Jose, CA (US)

(72) Inventors: Justin Legakis, Sunnyvale, CA (US); Byong Mok Oh, San Jose, CA (US)

(73) Assignee: Moju Labs, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,901

(22) Filed: Aug. 29, 2016

(65) Prior Publication Data
US 2016/0381300 A1     Dec. 29, 2016

Related U.S. Application Data

(63) Continuation of application No. 14/673,826, filed on Mar. 30, 2015, now Pat. No. 9,436,278.
(Continued)

(51) Int. Cl.
    *H04N 5/232*      (2006.01)
    *G06K 9/00*      (2006.01)
    (Continued)

(52) U.S. Cl.
CPC ....... *H04N 5/23293* (2013.01); *G06F 1/1694* (2013.01); *G06F 3/012* (2013.01); *G06F 3/0346* (2013.01); *G06F 3/0484* (2013.01); *G06K 9/00221* (2013.01); *G06K 9/00255* (2013.01); *G06K 9/00711* (2013.01); *G06K 9/22* (2013.01);
(Continued)

(58) Field of Classification Search
CPC ............ H04N 5/23293; H04N 5/23216; G06F 3/0484; G06F 3/0346; G06T 2207/10024; G06K 9/00255
See application file for complete search history.

(56) References Cited

U.S. PATENT DOCUMENTS

| | | | |
|---|---|---|---|
| 8,416,277 | B2 | 4/2013 | Yeh |
| 8,810,666 | B2 | 8/2014 | Grundmann |

(Continued)

OTHER PUBLICATIONS

Office Action for U.S. Appl. No. 14/673,831, dated Jun. 1, 2017, 11 Pages.
(Continued)

*Primary Examiner* — Ahmed A Berhan
(74) *Attorney, Agent, or Firm* — Fenwick & West LLP

(57) ABSTRACT

A set of sequential images are accessed. Measures of background stability across a set of images are determined, and the set of images is stabilized based on the determined measures. The images are cropped and stored in sequential order. A first image from the set of cropped images is displayed, and data indicating a change in orientation is received. Responsive to a determination that the change in orientation is associated with forward progress, an image after the first image in the set of sequential images is displayed. Responsive to a determination that the change in orientation is associated with backward progress, an image before the first image in the set of sequential images is displayed. The set of images can include a selected face of an individual and can be ordered chronologically, allowing a user to view older and younger images of the individual when navigating the set of images.

20 Claims, 11 Drawing Sheets

Related U.S. Application Data

(60) Provisional application No. 61/973,386, filed on Apr. 1, 2014.

(51) Int. Cl.

| | | |
|---|---|---|
| *G06T 3/00* | (2006.01) | |
| *G06F 3/0346* | (2013.01) | |
| *G06F 3/0484* | (2013.01) | |
| *G06F 1/16* | (2006.01) | |
| *G06K 9/22* | (2006.01) | |
| *H04N 1/21* | (2006.01) | |
| *G06T 7/20* | (2017.01) | |
| *G06F 3/01* | (2006.01) | |
| *G06T 7/38* | (2017.01) | |

(52) U.S. Cl.
CPC .......... *G06T 3/0087* (2013.01); *G06T 3/0093* (2013.01); *G06T 7/20* (2013.01); *G06T 7/38* (2017.01); *H04N 1/2175* (2013.01); *H04N 5/23219* (2013.01); *H04N 5/23258* (2013.01); *H04N 5/23264* (2013.01); *H04N 5/23267* (2013.01); *G06T 2207/10016* (2013.01); *G06T 2207/10024* (2013.01); *G06T 2207/20081* (2013.01); *G06T 2207/20132* (2013.01); *G06T 2207/30201* (2013.01)

(56) References Cited

U.S. PATENT DOCUMENTS

| | | | |
|---|---|---|---|
| 8,824,833 B2 | 9/2014 | Dagher | |
| 9,041,727 B2 | 5/2015 | Ubillos | |
| 9,123,125 B2 | 9/2015 | Cheng | |
| 9,196,306 B2 | 11/2015 | Flint | |
| 2001/0010546 A1* | 8/2001 | Chen | H04N 5/23293 348/218.1 |
| 2008/0052945 A1 | 3/2008 | Matas | |
| 2010/0061657 A1 | 3/2010 | Chien | |
| 2010/0136957 A1 | 6/2010 | Horodezky et al. | |
| 2011/0069085 A1 | 3/2011 | Weber | |
| 2014/0118390 A1 | 5/2014 | Ioffe | |
| 2014/0337791 A1 | 11/2014 | Agnetta | |
| 2014/0354786 A1 | 12/2014 | Takahashi et al. | |
| 2015/0131872 A1 | 5/2015 | Ganong | |
| 2015/0278581 A1 | 10/2015 | Fukushima | |

OTHER PUBLICATIONS

Office Action for U.S. Appl. No. 14/673,831, dated Jul. 12, 2017, 13 Pages.

Cho, S-J., et al., "Multi-Context Photo Browsing on Mobile Devices Based on Tilt Dynamics," 9th International Conf. on Human Computer Interaction with Mobile Devices and Services, Sep. 9-12, 2007, pp. 190-197.

* cited by examiner

MOTION-BASED CONTENT NAVIGATION

CROSS REFERENCE TO RELATED APPLICATIONS

This application is a continuation of U.S. application Ser. No. 14/673,826, entitled "Motion-Based Content Navigation," filed on Mar. 30, 2015, now U.S. Pat. No. 9,436,278, which claims the benefit of and priority of U.S. Provisional Patent Application No. 61/973,386, entitled "Motion-Based Content Navigation," filed on Apr. 1, 2014, the entireties of which are incorporated by reference herein.

BACKGROUND

1. Field of the Disclosure

This disclosure pertains in general to content navigation, and more specifically to motion-based content navigation.

2. Description of the Related Art

Mobile devices, such as phones, tablets, music players, and gaming devices, are becoming ubiquitous and an integral part of user's daily lives. Users carry mobile devices not only for communication in a traditional sense, but also as an all in one device—a personal phone, a music player, an internet browser, an interactive map, a camera, a journal, a social network interaction tool, etc.

A typical mobile device includes a display and hardware for user input. Many consumer mobile devices further include a camera and several sensors. Independent components of consumer mobile devices generally do not provide device motion based content navigation. Users capture and consume data on mobile devices. For example, captured data can include images, each image associated with motion sensor data corresponding to the image. When the captured content is consumed by the user, the images are viewed independent of the motion sensor data.

SUMMARY

Embodiments relate to motion-based content navigation. A set of sequential images is accessed. Measures of background stability across the set of images are determined. If the background stability exceeds a threshold, the set of images is stabilized using a first method corresponding to the alignment of image backgrounds and the subsequent warping of sequential images. If the background stability is below a threshold, the set of images is stabilized using a second method corresponding to the alignment of the set of images, the determination of center points of the aligned images, and the determination of a trend line based on the determined center points. After the set of images is stabilized, the images are cropped and stored in sequential order (for instance, in chronological order).

A first image from the set of cropped images is displayed. Data indicating a change in orientation is received. Responsive to a determination that the change in orientation is associated with forward progress, an image after the first image in the set of sequential images is displayed. Responsive to a determination that the change in orientation is associated with backward progress, an image before the first image in the set of sequential images is displayed.

Embodiments also relate to motion-based content navigation of images based on the detection of faces within the images. A set of images is accessed and faces in each image in the set of images are detected. Responsive to a selection of one face from the detected faces, a subset of images including images of the selected face is identified. The subset of images can be ordered, for instance, chronologically. A first image from the subset of images is displayed. Data indicating a change in orientation is received. Responsive to a determination that the change in orientation is associated with forward progress, an image after the first image in the set of sequential images is displayed. Responsive to a determination that the change in orientation is associated with backward progress, an image before the first image in the set of sequential images is displayed.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that can be employed without departing from the principles discussed herein. Reference will now be made in detail to several embodiments, examples of which are illustrated in the accompanying figures.

Figure 1:
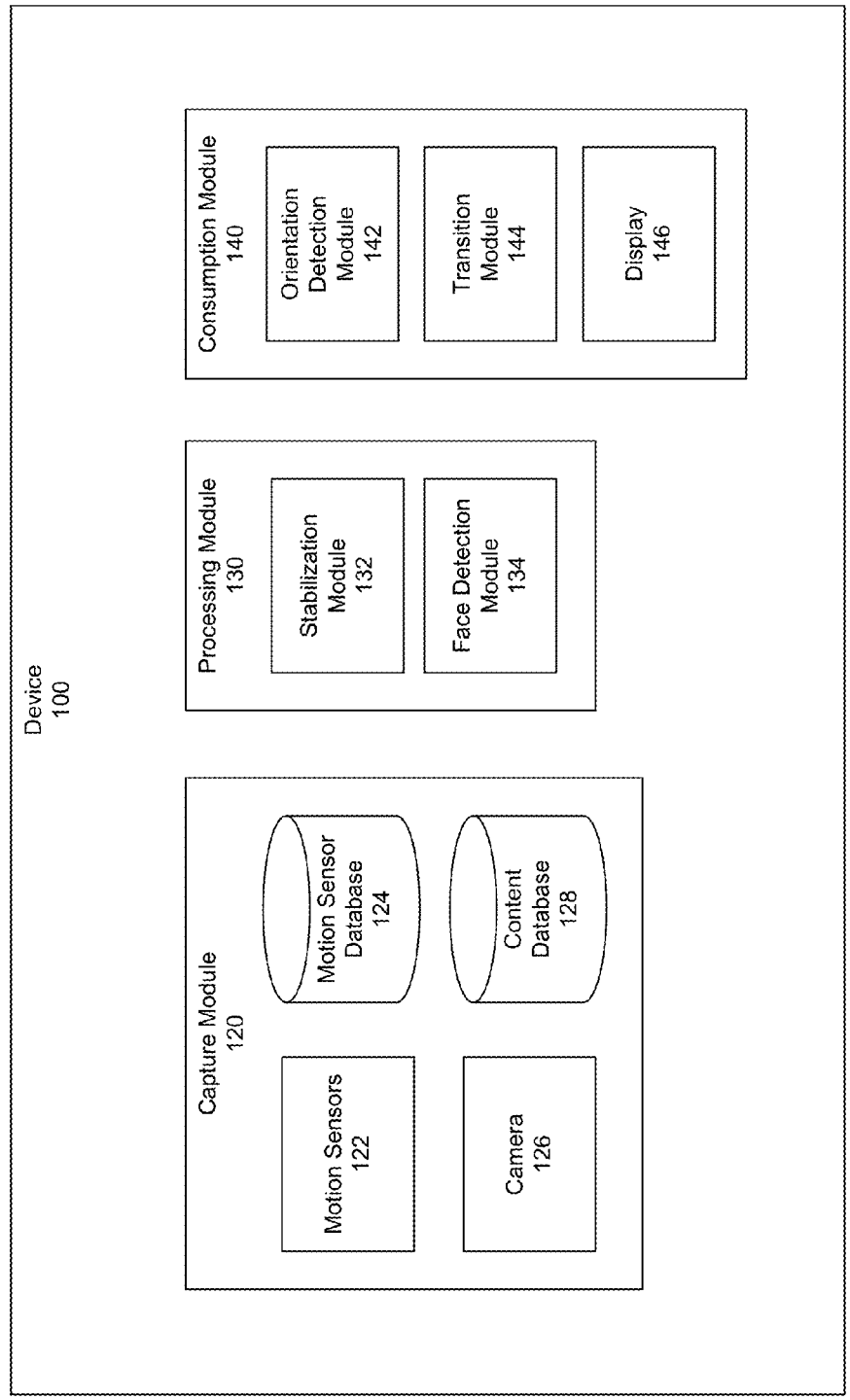
FIG. 1 is a block diagram illustrating a device for motion-based content navigation, according to one embodiment.

FIG. 1 is a block diagram illustrating a device for motion-based content navigation, according to one embodiment. A device 100 includes a capture module 120, a processing module 130, and a consumption module 140, according to one embodiment. The device 100 captures images and other sensor data via the capture module 120. The device 100 then processes the captured images via the processing module 130. Finally, the device 100 provides the processed images for interactive motion-based navigation via the consumption module 140. The device 100 can be any device capable of displaying images, such as a smart phone, a tablet computer, or any other suitable user device or computing device. The device 100 includes a processor and a non-transitory computer-readable storage medium storing executable instructions that, when executed by the processor, perform the functionalities described herein.

Image Series Capture

The capture module 120 captures a set of images (or "image series" or "image sequence" hereinafter) and motion sensor data and provides the captured set of images and data to the processing module 130 for processing. The capture module 120 includes motion sensors 122, a motion sensor database 124, a camera 126, and a content database 128. Motion sensor data captured by the motion sensors 122 is stored in the motion sensor database 124, and images captured by the camera 126 are stored in the content database 128. In some embodiments, the set of images captured by the camera 126 can include any number of successively captured images, each of which can be associated with a particular timestamp representative of a time at which the image was captured. The set of images is ordered into a sequence, such that a first image captured before a second image is stored within the set of images before the second image. The capture module 120 can be configured to operate in two modes: selective capture mode and session capture mode.

In the selective capture mode, the capture module 120 captures images from the camera 126 and corresponding data from the motion sensors 122 at pre-determined times. In one example, the pre-determined times are defined by a user of the device 100 via user input. The user can also explicitly request the camera 126 to capture an image and the motion sensors 122 to capture motion sensor data by providing a user input via a camera button. In another example, the user can hold down the camera button to enable a burst mode of image capture. In the burst mode, data from the motion sensors 122 and images from the camera 126 are captured in succession at predetermined time intervals. For example, a user can enable a burst mode of image capture corresponding to 15 frames per second ("fps") for 2 seconds. In some embodiments, the duration of the burst mode directly corresponds to the length of time the user holds down the camera button.

In the session capture mode, the capture module 120 captures data from the motion sensors 122 and images from the camera 126 at predetermined times during a capture interval of time (referred to herein as an "image capture session", or simply "session"). The predetermined times are defined, for instance, by the capture module 120 or by the user of the device 100. A session can start and end in response to a user input, in response to pre-defined session capture mode settings, or based on any other suitable criteria.

The motion sensors 122 can include one or more global positioning systems (GPS), magnetometers (compasses), gyroscopes, accelerometers, and microphones, among other sensors. Captured motion data can be filtered before being stored in the motion sensor database 124. Example filtering operations include the application of a Kalman filter, a Gaussian smoothing filter, mean filtering, and median filtering. The images captured by the camera 126 can include a raw image format (e.g., .cr2, .nef, .sr2, etc.). Captured images are stored in the content database 128. In some embodiments, the images can be encoded before storing the images in in the content database 128. Example encoded formats can include .jpg, .png, .tif, and the like.

It should be noted that although reference is made herein to the capture of images for processing and consumption by the processing module 130 and the consumption module 140, in alternative embodiments, instead of capturing images, the capture module 120 accesses previously captured and stored images (for instance, by the capture module 120 itself or an external module) for processing and consumption. Similarly, in some embodiments, motion data can be imported from a source other than the motion sensors 122. In some embodiments, images and motion data are imported from a camera roll or photo album stored on the device 100, or stored on an external device. For example, a user can import images and motion data from a cloud storage service such as GOOGLE DRIVE, SMUGMUG, DROPBOX, BOX, and/or FLICKR.

In some embodiments, after capturing images, the databases 124 and 128 synchronize the captured images with the captured motion data. The synchronization can include associating motion data stored in the motion sensor database 124 with images stored in the content database 128. For example, motion data captured at a time at which an image is captured can be identified by querying the motion sensor database 124 with the time of image capture to identify motion data captured at the identified data. Continuing with this example, the identified motion data can be subsequently associated with the image. In some embodiments, motion data associated with an image can be stored as metadata within an image file or container, or can be associated with an image identifier identifying the image.

Image Series Processing

The processing module 130 processes and formats the image series captured by the capture module 120 for consumption by a user via the consumption module 140. The stabilization module 132 accesses and stabilizes a set of images from the content database 128 using corresponding motion sensor data in the motion sensor database 124. The face detection module 134 detects faces within the set of images. The stabilization module 132 can be configured to stabilize images captured in each of two modes: single view capture mode and multi-view capture mode.

The stabilization module 132 is configured to perform operations on the set of images, including motion modeling, feature detection, feature correspondence, pair-wise registration, and/or global optimization. Motion modeling includes defining a parameter space in which the alignment of the set of images can be optimized, either in 2-dimensions (2D) or 3-dimensions (3D). The 2D model assumes the images can be aligned in a 2D image plane, and the 3D model assumes the images can be aligned in a 3D space. Feature detection is a low-level image processing operation that includes detecting and classifying image features within the set of images using one or more feature detection algorithms. Examples of feature detection algorithms include edge detection, corner detection, blob detection, and the Hough transform. Feature correspondence operations map detected features across images within the set of images to optimize pose estimation of each image relative to each other image. Pose estimation includes determining each detected feature's position and orientation relative to a coordinate system universal to the set of images. For example, feature correspondence identifies common edges or key-points across multiple images. Pair-wise registration and global optimization operations allow the iterative estimation of a position of an image relative to one or more other images in the set of images.

As used herein, "single view capture mode" refers to the capture and processing of a set of images by a camera 126 from a relatively immobile position (e.g., the camera moves by less than a threshold amount for the duration of the capture period). The stabilization module 132 can determine if a set of images are captured in a single view capture mode based on the motion sensor data corresponding to the captured images (e.g., by determining if the motion sensor data represents a greater than threshold amount of movement during capture of the corresponding set of images). Likewise, the stabilization module 132 can determine if a set of images are captured in a single view capture mode by analyzing the set of images (e.g., to determine if the image data within the set of images represents a greater than threshold mount of movement during capture of the set of images).

To determine if a set of images is captured in a single view capture mode from motion sensor data, a constant threshold value can be used for each of dimension of each motion sensor of the motion sensors 122. Examples of motion sensor dimensions include rotation along any axis, velocity/acceleration/attitude in each of the X-, Y-, and Z-dimensions, and the like. If the change in sensor data over a predetermined period of time (during which a set of images is captured) of a threshold number of the motion sensor dimensions is below a threshold value for each dimension, the set of images are classified as "single view" images. Likewise, if the change in sensor data over a predetermined period of time of a threshold number of the motion sensor dimensions is greater than a threshold value for each dimension, the set of images is classified as "multi-view" images.

Figure 2A:
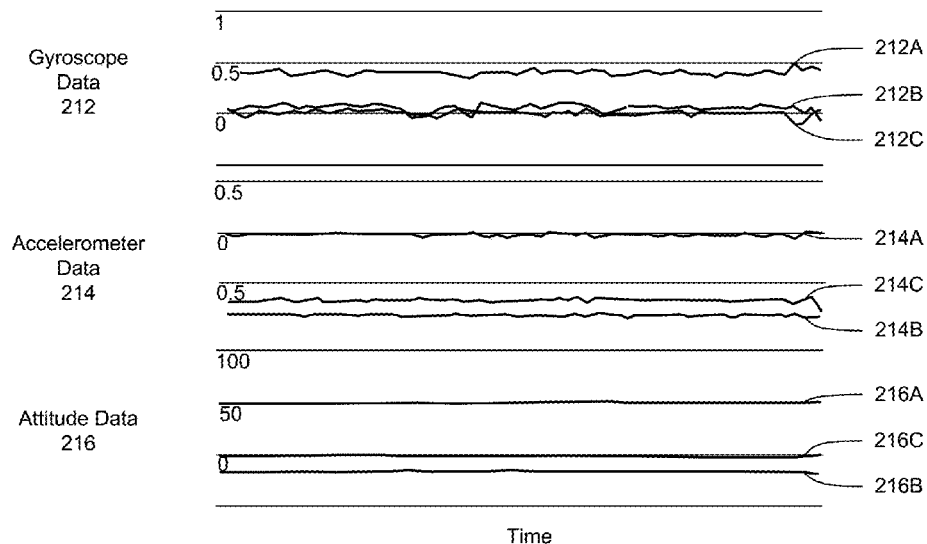
FIG. 2A illustrates various motion sensor data and attitude data for a single view image series capture, according to one embodiment.

FIG. 2A illustrates various motion sensor data and attitude data for a single view image series capture, according to one embodiment. Variations in gyroscope data 212, accelerometer data 214, and attitude data 216 (hereinafter collectively referred to as "single view data 212, 214 and 216") illustrate movement during a capture session of a set of images by a device 100. 212A, 212B, and 212C represent gyroscope data for each of the X-, Y-, and Z-dimensions, respectively. 214A, 214B, and 214C represent accelerometer data for each of the X-, Y-, and Z-dimensions, respectively. 216A, 216B, and 216C represent attitude data for each of the X, Y, and Z dimensions, respectively. In this example, the change in sensor data over a period of time measured for each dimension of each of the single view data 212, 214, and 216 is below the threshold delta for each dimension (not illustrated in FIG. 2A); accordingly, the stabilization module 132 can classify the images as a set of "single view" images.

The stabilization module 132 can also determine if a set of images is captured in a single view mode by aligning and overlapping the set of images. If the overlap of the aligned images is above an overlap threshold, the set of images can be classified as a set of single view images. It should be noted that in some embodiments, in order for a set of images to be classified as captured in a single view mode, both the motion data associated with the set of images must indicate that the set of images was captured in a single view mode and the analysis of the image data must indicate that the set of images was captured in a single view mode.

Figure 2B:
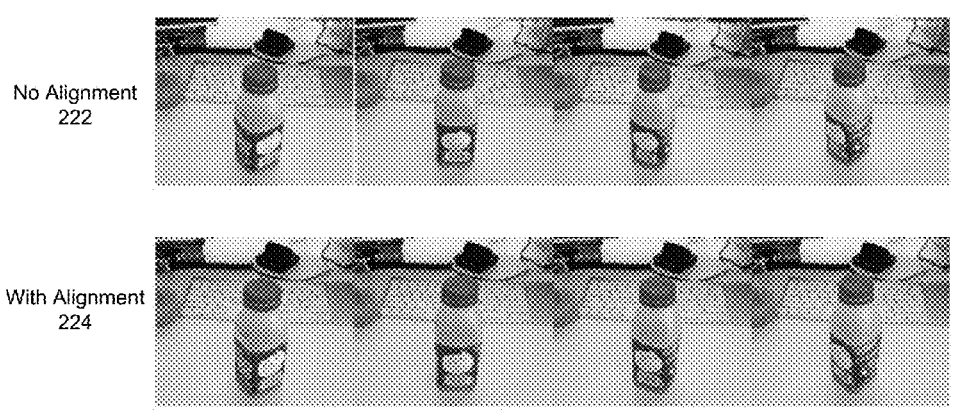
FIG. 2B illustrates a series of unaligned images juxtaposed with a series of aligned images, according to one embodiment.

FIG. 2B illustrates a series of unaligned images juxtaposed with a series of aligned images, according to one embodiment. The sets of images illustrated in FIG. 2B include a juice bottle in the foreground, and other objects, such as a keyboard and a glass of juice, in the background. The set of images 222 in the top row of FIG. 2B are not aligned, and the set of images 224 in the bottom row are an aligned version of the images of the top row. Aligned images 224 compensate for variations between images originating from incidental movement during typical operation of device 100.

Figure 2C:
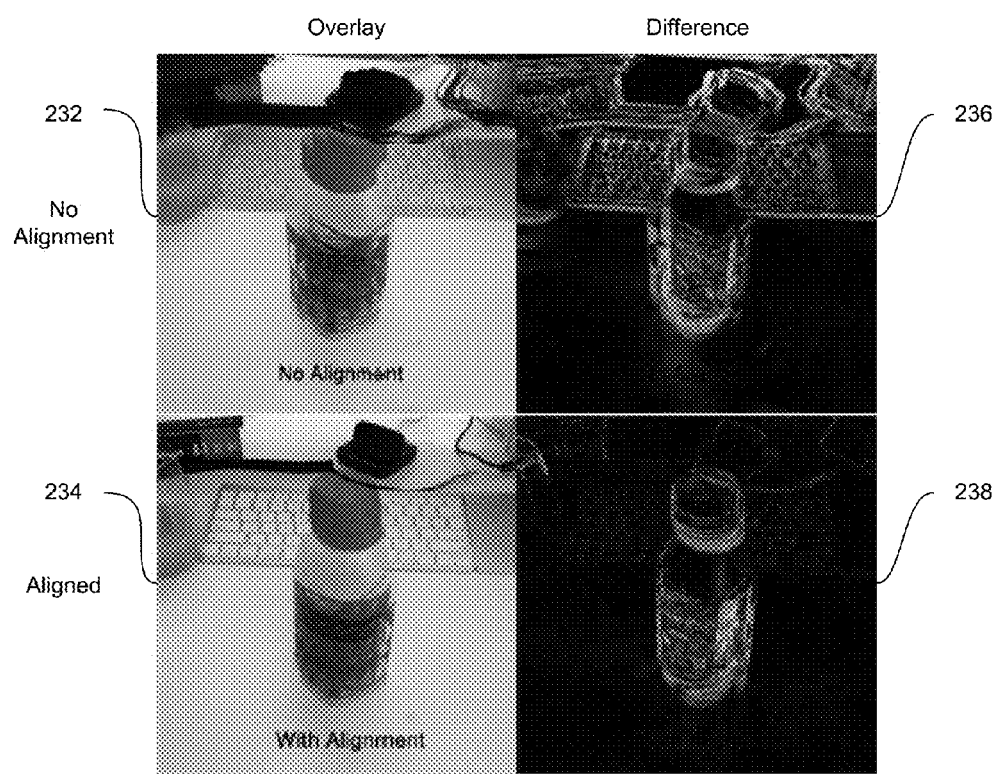
FIG. 2C illustrates an overlay and difference composite image for the series of unaligned images and the series of aligned images, according to one embodiment.

FIG. 2C illustrates an overlay and difference composite image for the series of unaligned images and the series of aligned images, according to one embodiment. In a single view capture mode, "without alignment" refers to a set of images as captured (i.e., unprocessed or unaligned images). Image 232 shows an overlay of the set of images without alignment. The image 232 shows considerable variations in the foreground and background of each image in the sequence of images. For example, the keyboard and glass of juice in the background of the image 232 are blurred due to the difference in position of the keyboard and glass within the set of images. Image 236 shows a difference of the image information of the set of images without alignment. The image 236 shows considerable variations in the image information of both the foreground and background of each image in the sequence of images.

The alignment of the set of sequential images in FIG. 2C is computed using a 2D planar motion model. In one example, the stabilization module 132 detects features in each image and maps the detected features across images in the set of sequential images. The stabilization module 132 can perform pair-wise registration by mapping features from a first image in the set of sequential images to a second image in the set of sequential images, where the second image precedes the first image in the set, then by mapping features from the second image in the set to a third image in the set preceding the second image, and so forth. The stabilization module 132 can then warp and transform the registered images according to the 2D planar motion model. Classes of image warping include projective warping (warping by projecting from one plane through a point to another plane such that lines before the projective warping remain as lines after the projective warping) and affine warping (a special case of projective warping in which parallel lines and equispaced points are preserved after the warp, for instance by scaling, rotating, translating, and shearing the images). By warping and transforming the images in the set of sequential images, the four corners of each image are stretched by moving each corner independently in a 2D image space such that the detected image features are aligned within the set of sequential images producing a set of aligned images. In some embodiments, after warping and transforming the images, the difference information representative of the difference between the images in the set of images is computed, and the warping and transformation of the set of images is maintained in response to the computed difference information falling below a threshold.

Image 234 shows an overlay of the set of aligned images. The background objects, including the keyboard and glass filled with juice, show little to no variation, while the foreground object, the juice bottle, shows variation. Image 238 shows a difference of the image information of the set of aligned images. Again, the background objects show little to no variation and the foreground object shows variation. By identifying little to no background variation within the image 238 showing difference information for the set of aligned images, the set of images can be identified as captured in a single view mode.

To determine if a set of images is captured in a multi-view mode (representative of a user moving the camera 126 in more than one position or direction during a capture session), the stabilization module 132 analyzes images from the content database 128 and corresponding motion sensor data in the motion sensor database 124. In some embodiments, such a determination is made in response to a determination that a set of images was not captured in a single view mode. For instance, as noted above, if a change in sensor data over a predetermined period of time (during which a set of images is captured) of a threshold number of the motion sensor dimensions is greater than a threshold value for each dimension, the set of images is classified as "multi-view" images. Likewise, if the overlap of the aligned images is below an overlap threshold, the set of images can be classified by the stabilization module 132 as a multi-view set of images.

Figure 3A:
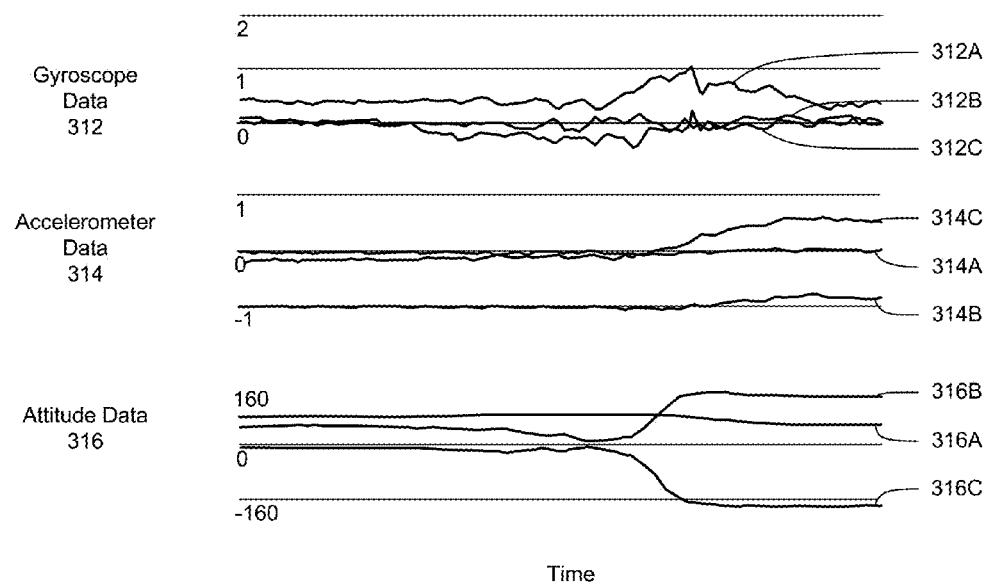
FIG. 3A illustrates various motion sensor data and attitude data for a multi-view image series capture, according to one embodiment.
Figure 3B:
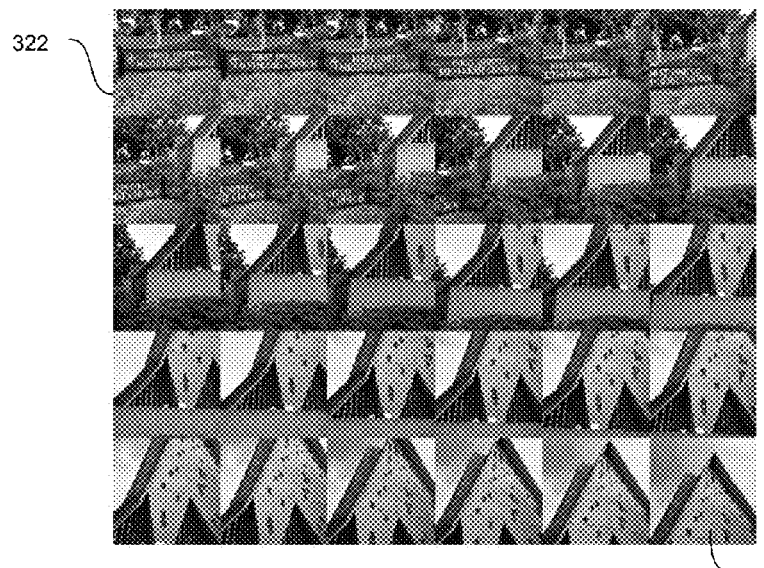
FIG. 3B illustrates a series of images captured via a multi-view capture, according to one embodiment.

FIG. 3A illustrates various motion sensor data and attitude data for a set of images captured in a multi-view mode, according to one embodiment. Variations in gyroscope data 312, accelerometer data 314, and derived attitude data 316 (hereinafter collectively referred to as "multi-view data 312, 314 and 316") illustrate movement during capture session of a set of images by a device 100. 312A, 312B, and 312C represent gyroscope data for each X-, Y-, and Z-dimensions, respectively. 314A, 314B, and 314C represent accelerometer data for each X-, Y-, and Z-dimensions, respectively. 316A, 316B, and 316C represent attitude data for each X-, Y-, and Z-dimensions, respectively. In this example, the change in sensor data over a period of time measured for each dimension of each of the multi-view data 312, 314 and 316 is above the threshold for each dimension (not illustrated in FIG. 3A); accordingly, the stabilization module 132 can classify the images as a set of "multi-view" images FIG. 3B illustrates a series of images captured via a multi-view capture, according to one embodiment. Image 322 is the first image in the set of sequential images and image 324 the last image in the set. As illustrated, the images in the set of sequential images have a motion moving from the camera 126 from left to right, then arcing from bottom to top. This is shown by the set of sequential images illustrated in FIG. 3B and the multi-view data 312, 314 and 316 illustrated in FIG. 3A.

For a set of sequential images captured in a multi-view mode, the stabilization module 132 performs one or more stabilization operations on the set of images include motion modeling, feature detection, feature correspondence, pair-wise registration, and/or global optimization, as described above. For a set of sequential images captured in a multi-view mode, the stabilization module 132 uses a 3D motion model to align the images. One example of a 3D motion model is a translation model, the implementation of which does not require the rotation, scaling, or warping of the images in the set of images—instead, the images are only optimized for translation in a 2D space.

Alternatively, the images in a set of sequential images can be aligned using up-vectors associated with each image. An up-vector is a vector representative of an upward direction relative to an image's scene. Up-vectors can be determined by the stabilization module 132 based on motion sensor data corresponding to each image in the set of sequential images. For instance, if motion data associated with an image indicates that the camera 126 was rotated 20 degrees clockwise around the Z-axis prior to capturing the image, an up-vector representative of a 20 degree counter-clockwise rotation around the Z-axis can be determined for the image. To align images using up-vectors, each image in the set of sequential images is rotated or warped such that the up-vectors associated with each image are parallel.

Figure 3C:
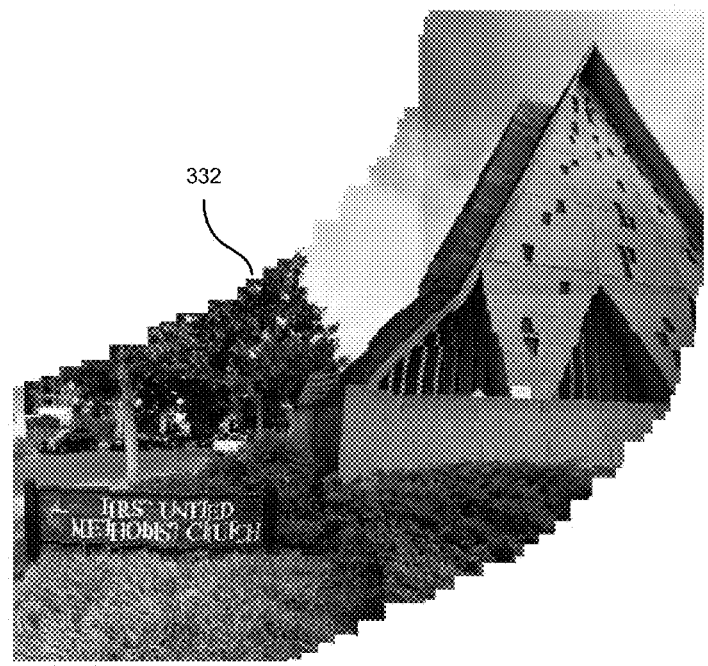
FIG. 3C illustrates a set of aligned images captured via a multi-view capture, according to one embodiment.
Figure 3D:
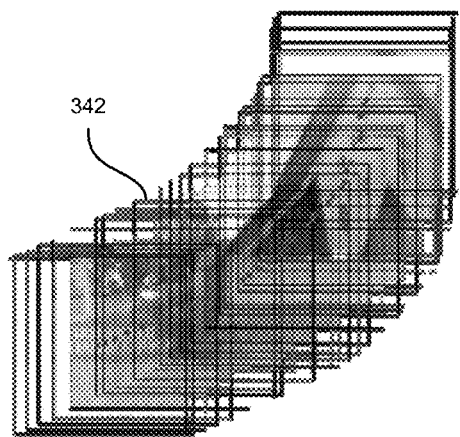
FIG. 3D illustrates determined center points of each image in the set of aligned images of FIG. 3C, according to one embodiment.
Figure 3E:
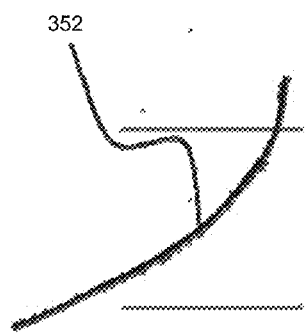
FIG. 3E illustrates curve fitting of the determined center points of the set of aligned images of FIG. 3C, according to one embodiment.

FIG. 3C illustrates a set of aligned images captured via a multi-view capture, according to one embodiment. For example, images 332 of FIG. 3C can be aligned using the up-vector associated with each image, as described above. The stabilization module 132 can pair-wise register the set of aligned sequential images by determining the center point of each image in the set, fitting a curve to the determined center points, and cropping the images based on the distance from the determined center points of the images and the curve. FIG. 3D illustrates one example of the determined center points of each image in the set of aligned images of FIG. 3C. In the embodiment of FIG. 3D, ach image 342 includes a determined center point. FIG. 3E illustrates an example of curve fitting of the determined center points of the set of aligned images of FIG. 3C. Fitting a curve to the center points of the images can include the application of a smoothing function to a line connecting the center points of the images. Examples of curve fitting operations include a least squares function, the Levenberg-Marquardt algorithm, nonlinear regression, or any other suitable operation. An adjusted center for each image is determined by identifying a point within the image to the curve 352, and the images are cropped based on the distances between the determined adjusted centers and the center points of the images.

Figure 3F:
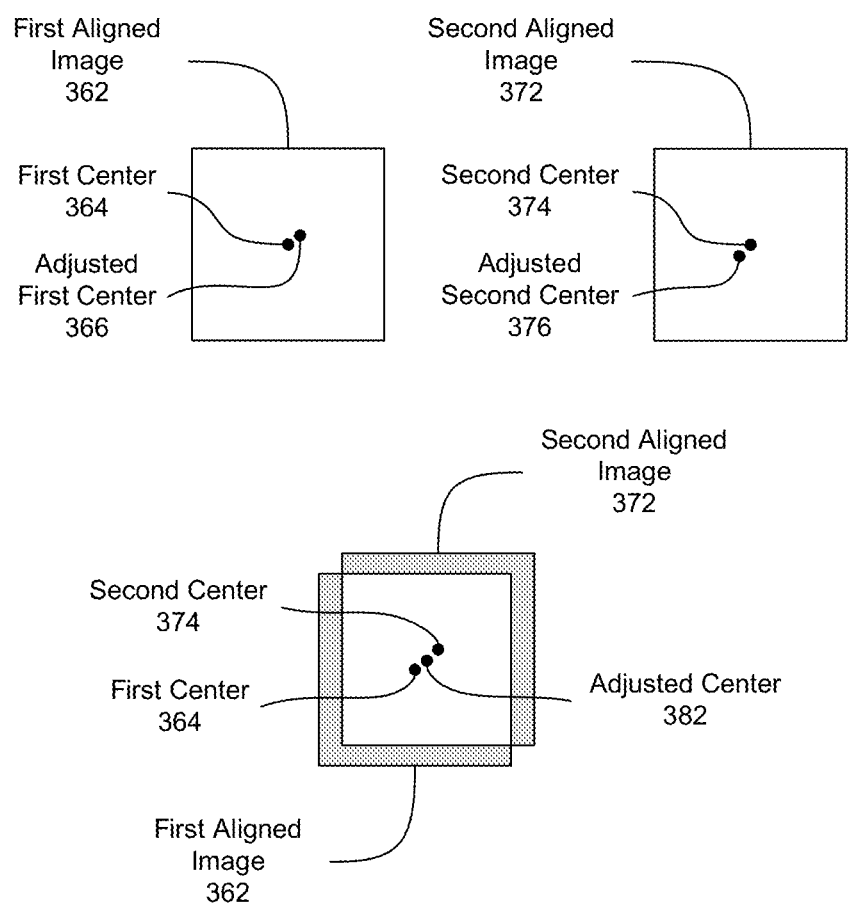
FIG. 3F illustrates the cropping of images in a set of aligned images based on the distance between the adjusted centers and the center points of the set of aligned images, according to one embodiment.

FIG. 3F illustrates cropping images in a set of aligned images based on the distance between the adjusted centers and the center points of the set of aligned images, according to one embodiment. A first aligned image 362 has a first center point 364 and an adjusted first center 366 and a second aligned image 372 has a second center point 374 and an adjusted second center 376. The first image 362 and the second image 372 are overlaid such that the first adjusted center 366 and the second adjusted center 376 overlap at an adjusted center 382. Sections of the first image 362 not overlapping the second image 372 after the adjusted centers are aligned are cropped. Similarly, sections of the second image 372 not overlapping the first image 362 are cropped. The non-overlapping sections are illustrated in gray. This process is repeated for each image in the set of aligned images, producing a set of cropped images for subsequent consumption. It should be noted that after stabilization, alignment, or cropping by the stabilization module 132, sets of stabilized images, aligned images, and/or cropped images are stored in the content database 128.

Returning to FIG. 1, faces are detected by the face detection module 134. The face detection module 134 accesses images stored in the content database 128 and analyzes the accessed images to detect faces within the images. Images containing a same face are identified and ordered, for instance chronologically, creating a set of face-detected images. In one embodiment, a user of the device 100 selects a face from a plurality of detected faces, and the face detection module 134 identifies a set of face-detected images including the selected face. The set of face-detected images including the detected face is stored in the content database 128 for subsequent consumption.

In one example, a machine-learning process is used to detect the faces in each image in the set of images. The face detection module 134 can include a database with verified images of faces. The database of verified faces can be provided to the device 100 by a server (not shown) over a network (not shown). The machine learning process can use the database of verified faces as input when building a face detection model. The face detection model is used to identify or otherwise detect faces in the images from the set of images. The user can identify or otherwise tag a detected face as matching a particular person. If the user identifies a detected face, the model adds the detected face to the database of verified faces.

Each image in the set of face-detected images can be aligned such that the center of the selected face is the adjusted center of each image. Accordingly, the images in the set of face-detected images can be cropped as described above, creating a set of cropped face-detected images. Accordingly, each image in the set of cropped face-detected images includes the selected face located at the center of the image such that, when navigating through the set of cropped face-detected images, the selected face is located at the same position within the displayed image for each image in the set of cropped face-detected images.

As noted above, the set of face-detected images can be re-arranged in chronological order such that the first image in the set of re-arranged images has the latest capture date and the last image in the set has the earliest capture date, or vice versa.

The processing module 130 can perform additional image processing operations on images in a set of images based on various image patterns and/or using various image filters. The images in the set of images can be re-ordered based on at least one pattern and/or filter. A subset of images from the set of images can be created and stored based on one or more image patterns, examples of which include color space patterns, image space patterns, frequency space patterns, geographic location patterns (e.g., image metadata indicating similar geographic locations across multiple images), and chronological patterns (e.g., image timestamps indicate that the images were captured within a selected time interval).

In some embodiments, the processing module 130 applies one or more time-based filters to the images in the set of images. Unlike traditional static image filters, time-based filters change over the set of images. For example, the first image in the set of images can have a black and white image filter and the last image in the set of images can be the image as captured, with no filter. The second image in the set can include some color content, the third image more color content, the fourth image even more color content, etc. Accordingly, time-based filters, when applied to a set of images, incrementally transition a first image effect applied to the first image to a second image effect applied to the last image. A set of filtered images or a set of images including one or more image patterns can be stored in the content database 128 for subsequent processing and/or consumption as described herein.

Image Series Consumption

The consumption module 140 allows a user of the device 100 to consume a set of sequential images (such as a set of aligned images, cropped images, or face-detected images). The user interacts with device 100 by moving the device, and the orientation detection module 142 detects the movement. The transition module 144 then selects an image in the set of sequential images based on the detected movement and the currently displayed image. For instance, if a movement of the device is representative of a "progress forward" movement (for instance, a clockwise rotation around the Y-axis), the transition module 144 can select an image subsequent to a currently displayed image in the order of the set of sequential images. Likewise, if a movement of the device is representative of a "progress backward" movement (for instance, a counter-clockwise rotation around the Y-axis), the transition module 144 can select an image preceding a currently displayed image in the order of the set of sequential images. In some embodiments, the transition module 144 can select an image subsequent to or preceding the currently displayed image based on a magnitude of the detected movement. For instance, if the user of the device 100 sharply rotates the device 100 clockwise, the transition module 144 can select an image 3 or 4 images subsequent to the currently displayed image. Likewise, if the user of the device 100 slightly rotates the device 100 counter-clockwise, the transition module 144 can select an image 1 or 2 images preceding the currently displayed image. The display 146 displays the selected image, and can display an image transition effect when transitioning between the displayed image and the selected image.

Figure 4A:
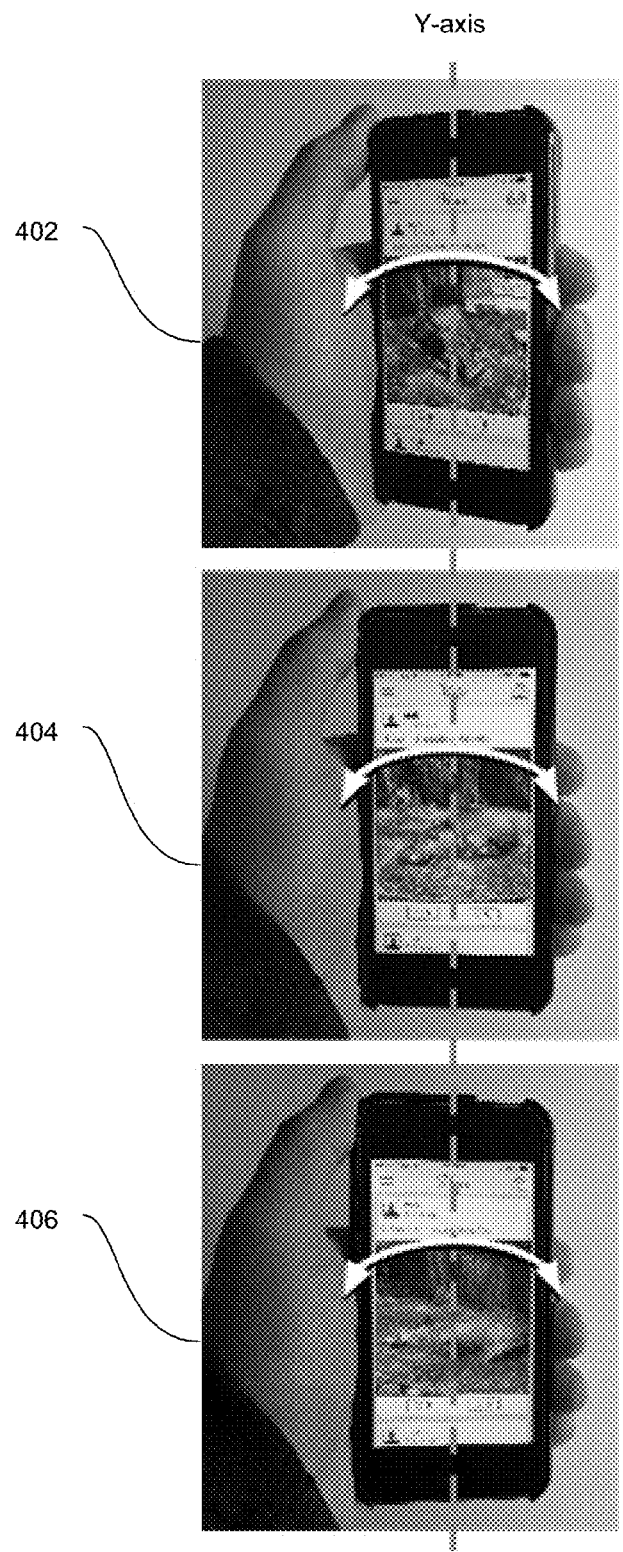
FIG. 4A illustrates the rotation of a device along a Y-axis, according to one embodiment.

FIG. 4A illustrates the rotation of a device along a Y-axis, according to one embodiment. Image 402 shows a user twisting the device 100 to a first position (e.g., counter-clockwise of the Y-axis), image 404 shows the user holding the device 100 in a second position (e.g., not rotated relative to the Y-axis), and image 406 shows the user twisting device 100 to a third position (e.g., clockwise of the Y-axis).

Figure 4B:
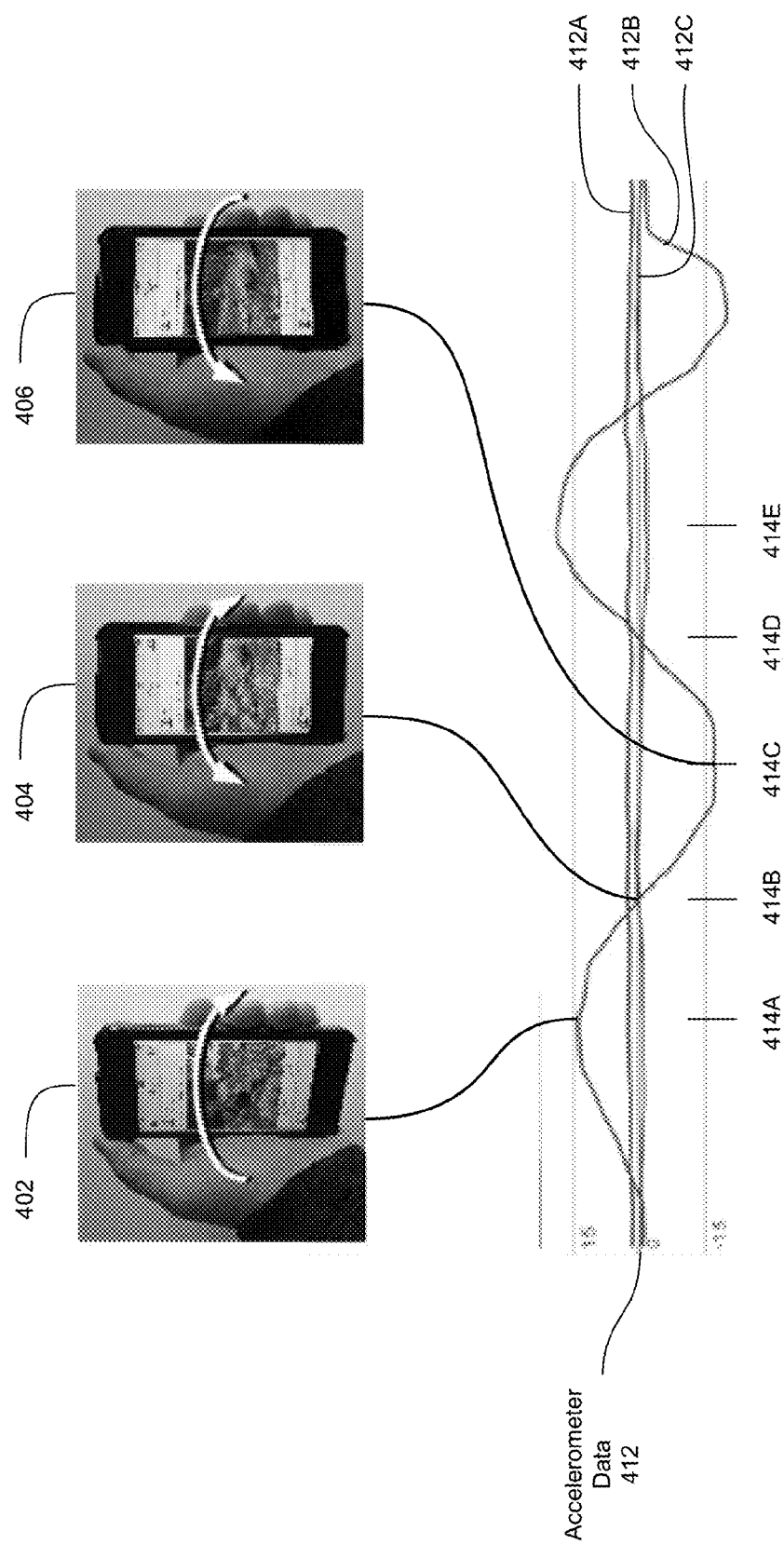
FIG. 4B illustrates accelerometer data corresponding to the rotation of a device along the Y-axis, according to one embodiment.

The motion sensors 122 can identify movement of the device 100, and can provide movement information describing the identified movement to the consumption module 140 for use in displaying a selected set of images. FIG. 4B illustrates accelerometer data corresponding to the rotation of a device along the Y-axis, according to one embodiment. Accelerometer data 412A, 412B, and 412C (hereinafter collectively referred to as "accelerometer data 412") represent acceleration in each of the X-, Y-, and Z-dimensions, respectively. Specifically, the accelerometer data 412 illustrates the user twisting the device 100 from the first position to the second position in a first direction (from time 414A to time 414B) and from the second position to the third position in the first direction (from time 414B to time 414C). The accelerometer data 412 further illustrates the user twisting the device 100 from the third position to the second position in a second direction (from time 414C to time 414D) and the user twisting the device 100 from the second position to the first position in the second direction (from time 414D to time 414E).

Figure 5:
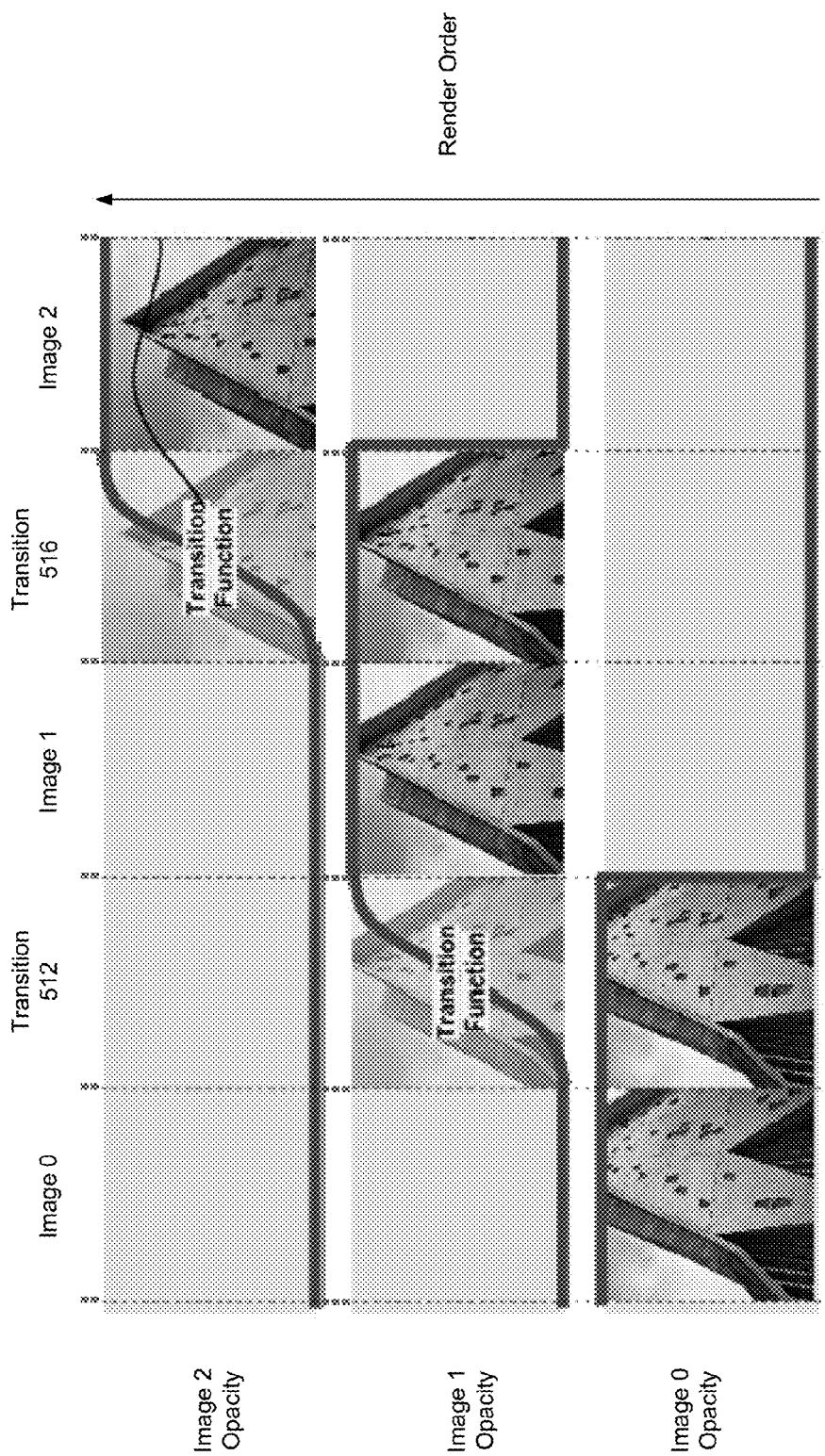
FIG. 5 illustrates the application of an image opacity effect during image transitions when navigating between images in a set of images, according to one embodiment.

FIG. 5 illustrates the application of an image opacity effect during image transitions when navigating between images in a set of images, according to one embodiment. In a first stage, the display 146 displays image 0 at 100% opacity. The orientation detection module 142 detects a change in orientation of the device 100 associated with forward progress (such as the twisting the device clockwise around the Y-axis). Responsive to the detected orientation change corresponding to forward progress, the transition module 144 selects image 1, and the display 146 displays a transition effect (transition 512). During the transition 512, the opacity of image 0 is decreased from 100% to 0% and the opacity of image 1 is simultaneously increased from 0% to 100%, for instance based on an "S" curve function, a linear function, and the like. Upon the display 146 displaying image 1 at 100% opacity, the orientation detection module 142 detects another change in orientation of the device 100 associated with forward progress. Responsive to the detected orientation change corresponding to forward progress, the transition module 144 selects image 2, and the display 146 displays a transition effect (transition 516) similar to the transition 512, until image 2 is displayed at 100% opacity.

Figure 6:
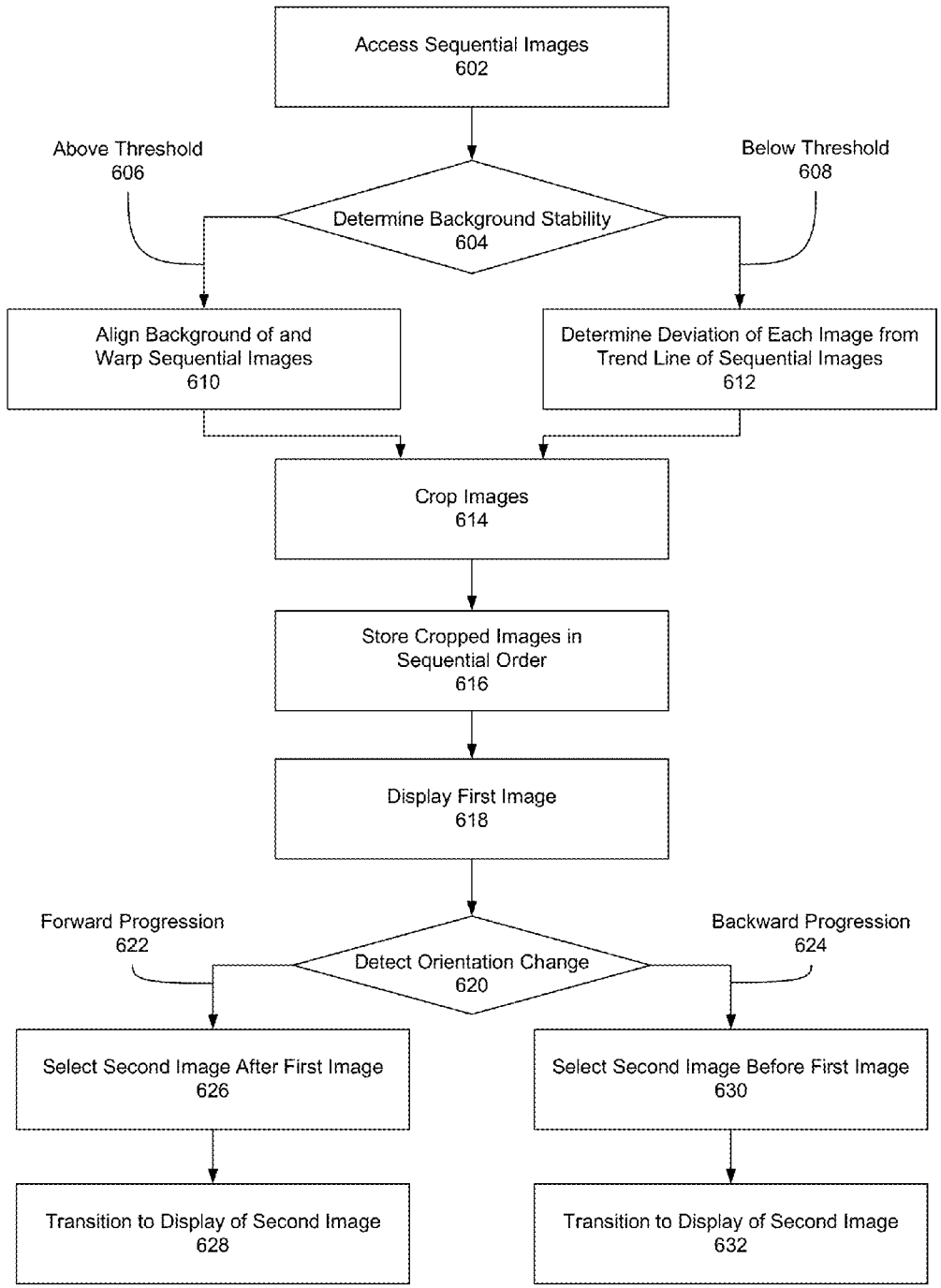
FIG. 6 is a flow chart of a method for motion-based content navigation for a set of images captured as a single view capture and/or a multi-view capture, according to one embodiment.

FIG. 6 is a flowchart of a method for motion-based content navigation for a set of images captured as a single view capture and/or a multi-view capture, according to one embodiment. A set of sequential images is accessed 602. In one embodiment, the set of sequential images are ordered chronologically. The background stability of the sequential images is determined 604. Responsive to the background stability being above 606 a threshold, the backgrounds of the set of images are aligned and the images are warped 610. Responsive to the background stability being below 608 the threshold, the deviation of each image from a trend line of the center points of the images in the set of sequential images is determined 612. The images are cropped 614 (for instance, based on the warped images or the determined deviations) and stored 616 in sequential order.

A first image is displayed 618, and a change in orientation is detected 620. Responsive to the detected orientation change corresponding to a forward progression 622, a second image subsequent to the first image is selected 626, and the display 146 transitions 628 from the first image to the second image. Responsive to the detected orientation change corresponding to a backward progression 624, a second image before the first image is selected 630, and the display 146 transitions 632 from the first image to the second image.

Figure 7:
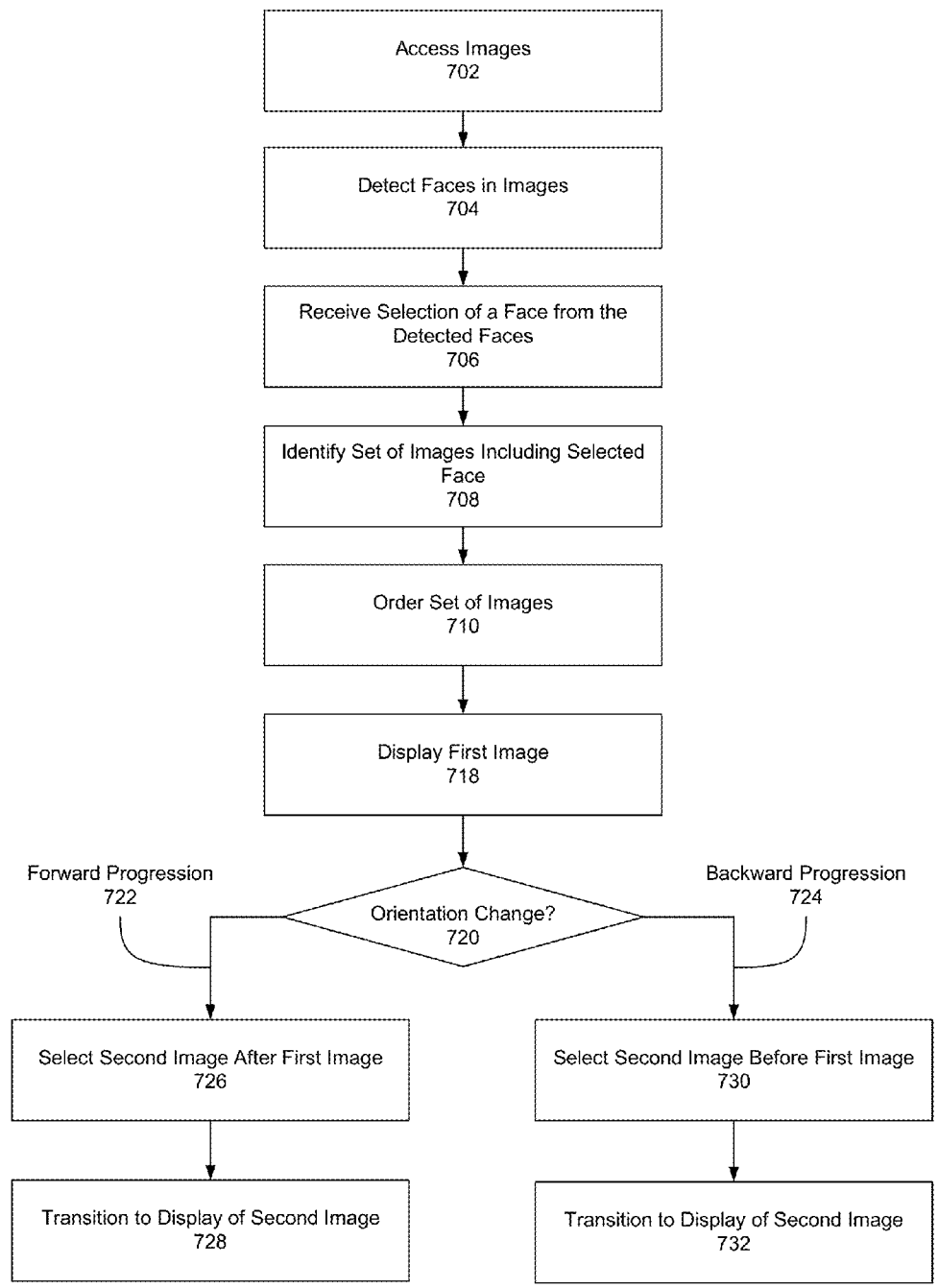
FIG. 7 is a flow chart of a method for motion-based content navigation for a set of images based on detected faces within the images, according to one embodiment.

FIG. 7 illustrates a flow chart of a method for motion-based content navigation for a set of images based on detected faces within the images, according to one embodiment. Images are accessed 702, and faces are detected 704 within the accessed images. A selection of a face from the detected faces is received 706, and a set of images including the selected face is identified 708. The set of images is ordered 710, for instance chronologically. A first image is displayed 718, and a change in orientation is detected 720. Responsive to the detected orientation change corresponding to a forward progression 722, a second image subsequent to the first image is selected 726, and the display 146 transitions 728 from the first image to the second image. Responsive to the detected orientation change corresponding to a backward progression 724, a second image before the first image is selected 730, and the display 146 transitions 732 from the first image to the second image.

Upon reading this disclosure, those of skill in the art will appreciate still additional alternative structural and functional designs for a system and a process for motion-based content navigation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, can be made in the arrangement, operation and details of the method and apparatus disclosed herein without departing from the spirit and scope defined in the appended claims.

What is claimed is:

1. A method comprising:
accessing a set of images ordered sequentially;
stabilizing the set of images by aligning backgrounds of images in the set of images, the set of stabilized images comprising a first image, a second image succeeding the first image in the set of stabilized images, and a third image preceding the first image in the set of stabilized images;
displaying, by a user device, the first image from the set of stabilized images;
responsive to detecting a change in orientation of the user device associated with forward progress, displaying the second image in the stabilized set of images; and
responsive to detecting a change in orientation of the user device associated with backward progress, displaying the third image in the stabilized set of images.

2. The method of claim 1, wherein stabilizing the set of images further comprises warping the images using projective warping.

3. The method of claim 1, wherein the set of images are ordered chronologically.

4. The method of claim 1, wherein the change in orientation of the user device associated with forward progress comprises a tilt in the user device to the right.

5. The method of claim 1, wherein the change in orientation of the user device associated with backward progress comprises a tilt in the user device to the left.

6. The method of claim 1, wherein each image in the accessed set of images comprises a frame, and wherein each frame is captured as part of a set of frames.

7. A non-transitory computer readable storage medium storing executable computer instructions that when executed are configured to perform steps including:
accessing a set of images ordered sequentially;
stabilizing the set of images by aligning backgrounds of images in the set of images, the set of stabilized images comprising a first image, a second image succeeding the first image in the set of stabilized images, and a third image preceding the first image in the set of stabilized images;
displaying, by a user device, the first image from the set of stabilized images;
responsive to detecting a change in orientation of the user device associated with forward progress, displaying the second image in the stabilized set of images; and
responsive to detecting a change in orientation of the user device associated with backward progress, displaying the third image in the stabilized set of images.

8. The non-transitory computer readable storage medium of claim 7, wherein stabilizing the set of images further comprises warping the images using projective warping.

9. The non-transitory computer readable storage medium of claim 7, wherein the set of images are ordered chronologically.

10. The non-transitory computer readable storage medium of claim 7, wherein the change in orientation of the user device associated with forward progress comprises a tilt in the user device to the right.

11. The non-transitory computer readable storage medium of claim 7, wherein the change in orientation of the user device associated with backward progress comprises a tilt in the user device to the left.

12. The non-transitory computer readable storage medium of claim 7, wherein each image in the accessed set of images comprises a frame, and wherein each frame is captured as part of a set of frames.

13. A system comprising:
a non-transitory computer-readable storage medium storing executable computer instructions that, when executed, perform steps comprising:
accessing a set of images ordered sequentially;
stabilizing the set of images by aligning backgrounds of images in the set of images, the set of stabilized images comprising a first image, a second image succeeding the first image in the set of stabilized images, and a third image preceding the first image in the set of stabilized images;

displaying, by a user device, the first image from the set of stabilized images;

responsive to detecting a change in orientation of the user device associated with forward progress, displaying the second image in the stabilized set of images; and responsive to detecting a change in orientation of the user device associated with backward progress, displaying the third image in the stabilized set of images; and a processor configured to execute the computer instructions.

14. The system of claim 13, wherein stabilizing the set of images further comprises warping the images using projective warping.

15. The system of claim 13, wherein the set of images are ordered chronologically.

16. The system of claim 13, wherein the change in orientation of the user device associated with forward progress comprises a tilt in the user device to the right.

17. The system of claim 13, wherein the change in orientation of the user device associated with backward progress comprises a tilt in the user device to the left.

18. The system of claim 13, wherein each image in the accessed set of images comprises a frame, and wherein each frame is captured as part of a set of frames.

19. A method comprising:

accessing a set of images ordered sequentially, the set of images comprising a first image, a second image succeeding the first image in the set of images, and a third image preceding the first image in the set of images;

displaying, by a user device, the first image from the set of images;

responsive to detecting a change in orientation of the user device associated with forward progress, displaying the second image in the set of images; and responsive to detecting a change in orientation of the user device associated with backward progress, displaying the third image in the set of images.

20. The method of claim 19, wherein each image in the accessed set of images comprises a frame, and wherein each frame is captured as part of a set of frames.

* * * * *